United States Patent
Lin

(10) Patent No.: US 7,050,414 B2
(45) Date of Patent: May 23, 2006

(54) METHOD AND APPARATUS FOR SETTING UP A CALL OVER A PACKET-BASED TRANSPORT NETWORK

(75) Inventor: I-Far Lin, Livermore, CA (US)

(73) Assignee: Lucent Technologies Inc., Murray Hill, NJ (US)

(*) Notice: Subject to any disclaimer, the term of this patent is extended or adjusted under 35 U.S.C. 154(b) by 916 days.

(21) Appl. No.: 09/888,188

(22) Filed: Jun. 22, 2001

(65) Prior Publication Data

US 2002/0196770 A1 Dec. 26, 2002

(51) Int. Cl.
*H04Q 7/24* (2006.01)

(52) U.S. Cl. .............. 370/338; 370/467; 455/432.1
(58) Field of Classification Search .......... 370/310.1, 370/310.2, 314, 328, 338, 352, 353, 354, 370/395.5, 395.52, 395.6, 465, 466, 467; 455/432.1, 432.2, 432.3, 433, 435.1
See application file for complete search history.

(56) References Cited

U.S. PATENT DOCUMENTS

| | | | | |
|---|---|---|---|---|
| 6,282,191 B1 * | 8/2001 | Cumberton et al. | ........ | 370/352 |
| 6,282,194 B1 * | 8/2001 | Cheesman et al. | .......... | 370/356 |
| 6,515,985 B1 * | 2/2003 | Shmulevich et al. | ....... | 370/356 |
| 6,618,588 B1 * | 9/2003 | Easley | ........................ | 455/433 |
| 6,757,278 B1 * | 6/2004 | Bi et al. | ..................... | 370/356 |
| 6,765,903 B1 * | 7/2004 | Allen, Jr. et al. | ........... | 370/356 |

* cited by examiner

*Primary Examiner*—Phirin Sam

(57) ABSTRACT

A method comprises the steps of directing a call intended for a mobile (531) to a virtual tandem switch (501). The virtual tandem switch (501), which may include multiple converters (505 and 507) queries a home location register to obtain call information for the mobile (531). The call to the mobile (531) is set up over a packet-based transport network (523).

15 Claims, 4 Drawing Sheets

- PRIOR ART -

METHOD AND APPARATUS FOR SETTING UP A CALL OVER A PACKET-BASED TRANSPORT NETWORK

FIELD OF THE INVENTION

This invention relates to communication systems, including but not limited to routing and processing of calls between the Public Switched Telephone Network (PSTN) and a wireless mobile device such as a cellular telephone.

BACKGROUND OF THE INVENTION

Various types of cellular communication systems are known to provide radio telephone service to a large number of mobile subscribers using a relatively small number of frequencies. Such service is provided by dividing a service area into a number of cells and reusing the frequencies in non-adjacent cells. This cellular principle has permitted a large growth in the amount of wireless telecommunications that may be carried over the allocated radio spectrum thus providing significant expansion in the number of wireless communication mobiles. Various different cellular protocols include analog, time division multiple access (TDMA), code division multiple access (CDMA), Global System for Mobile Communications (GSM), and Universal Mobile Telecommunications System (UMTS).

In many wireless communication systems, Home Location Registers (HLRs) and Visitor Location Registers (VLRs) are used to handle mobility management. An HLR contains profile information for each of its mobile subscribers and the address of the current VLRs for each mobile. Each Mobile Switching Center (MSC) has a VLR that tracks mobiles currently receiving service in the serving MSC's coverage area. Whenever a mobile enters an area served by a new VLR and registers there, the latter informs the mobile's HLR of the change in the mobile's location. In addition, the VLR downloads the service profile of the roaming mobile as well as other information necessary for call termination at the mobile. During call delivery, the location and profile information in the HLR is utilized to route incoming calls to the mobile.

An example of a PSTN to wireless system that provides roaming capability between a PSTN and a roaming mobile is shown in FIG. 1. Long distance networks are shown between the PSTN and the home MSC, where the roaming mobile has its home system, and between the home MSC and the serving MSC, where the roaming mobile is currently located, in order to provide roaming capability to a roaming mobile. When roaming, the mobile may be a significant distance away from its home MSC.

An example timing diagram with a signal flow for a PSTN originated call to a roaming mobile is shown in FIG. 2. Once a roaming mobile registers with a serving MSC in the geographical area of the mobile, the mobile is able to receive calls at this location, including calls from the PSTN. When a call from a calling party to the roaming mobile utilizes the PSTN, the initial call setup is performed on a TDM (Time Division Multiplexed) long distance (LD) network. Quite often, a second TDM long distance network, or perhaps the same long distance network in a second call, is utilized to obtain call information and set up the call between the home MSC and the serving MSC. Further, the cellular system operator may not operate its own long distance network, and must pay tolls to long distance network carriers in order to complete the call set-up.

A problem with this call delivery mechanism is that a call may traverse through the TDM long distance network twice, even when the roaming mobile visits the area where the PSTN calling party resides. The same problem manifests itself in a densely populated area where a wireless network serves several local area transport areas (LATAs). This type of call may incur many unnecessary intra-LATA calls. Thus, utilizing long-distance connections to provide a call to a roaming subscriber is both expensive and a traffic burden on long distance networks.

Accordingly, there is a need for a method and apparatus for providing a roaming mobile with access to the PSTN and other networks distant from his home network without causing undue traffic or expense on existing networks.

SUMMARY

A method comprises the steps of directing a call intended for a mobile to a virtual tandem switch. The virtual tandem switch queries a home location register to obtain call information for the mobile. The call to the mobile is set up over a packet-based transport network.

DESCRIPTION OF A PREFERRED EMBODIMENT

The following describes an apparatus for and method of providing calls from the PSTN to a roaming mobile in a wireless network by utilizing a virtual tandem switch (VTS). The VTS provides dual functions in a new network configuration. To the PSTN end office switches, the VTS acts like a TDM tandem switch that provides a gateway to access all the MSC switches. To the MSC switches, the VTS acts like a virtual MSC, with the ability to query for location and transport voice traffic up to the MSCs.

Figure 1:
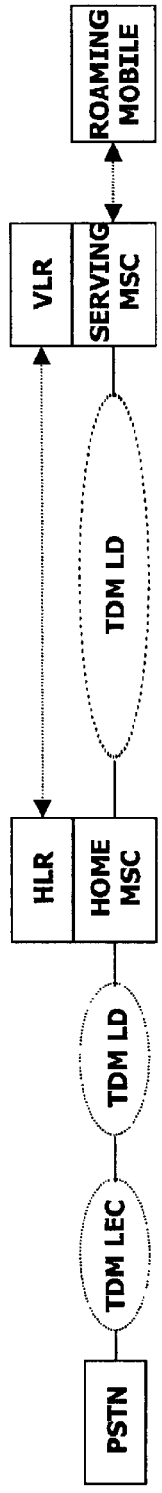
FIG. 1 is a block diagram of a PSTN to wireless system.
Figure 3:
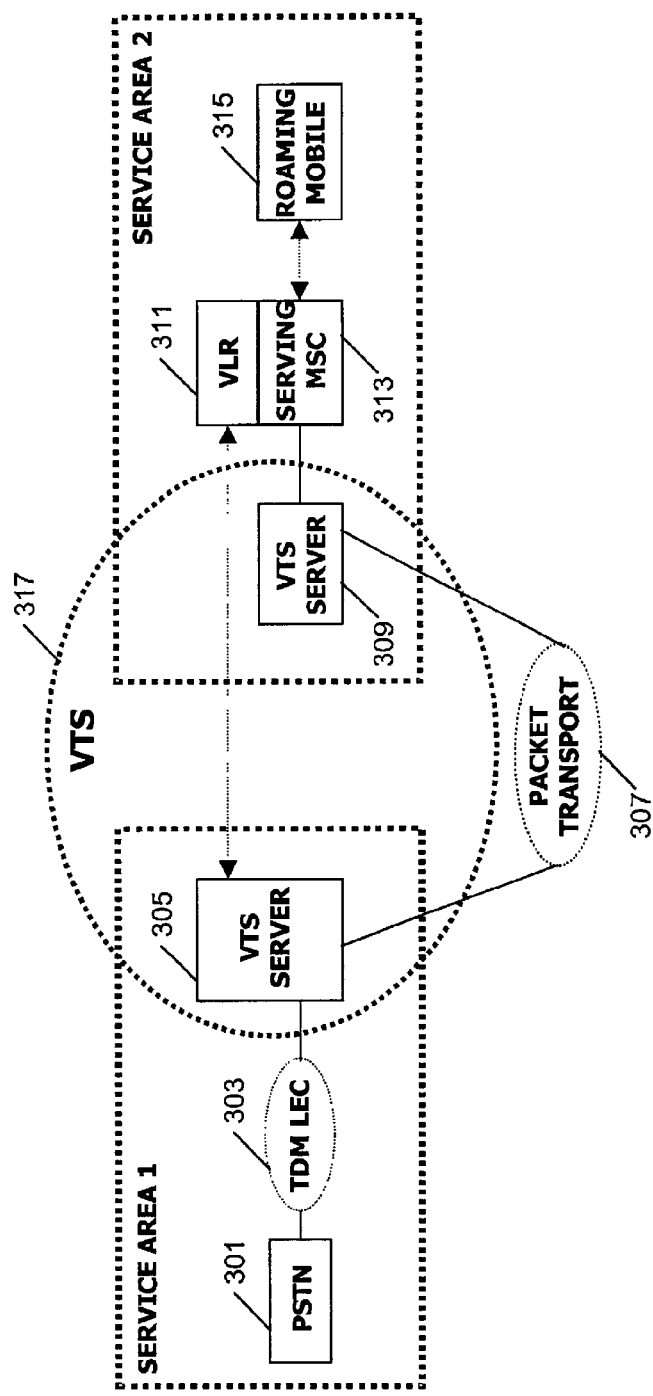
FIG. 3 is a block diagram of a communication system utilizing a virtual tandem switch (VTS) in accordance with the invention.
Figure 2:
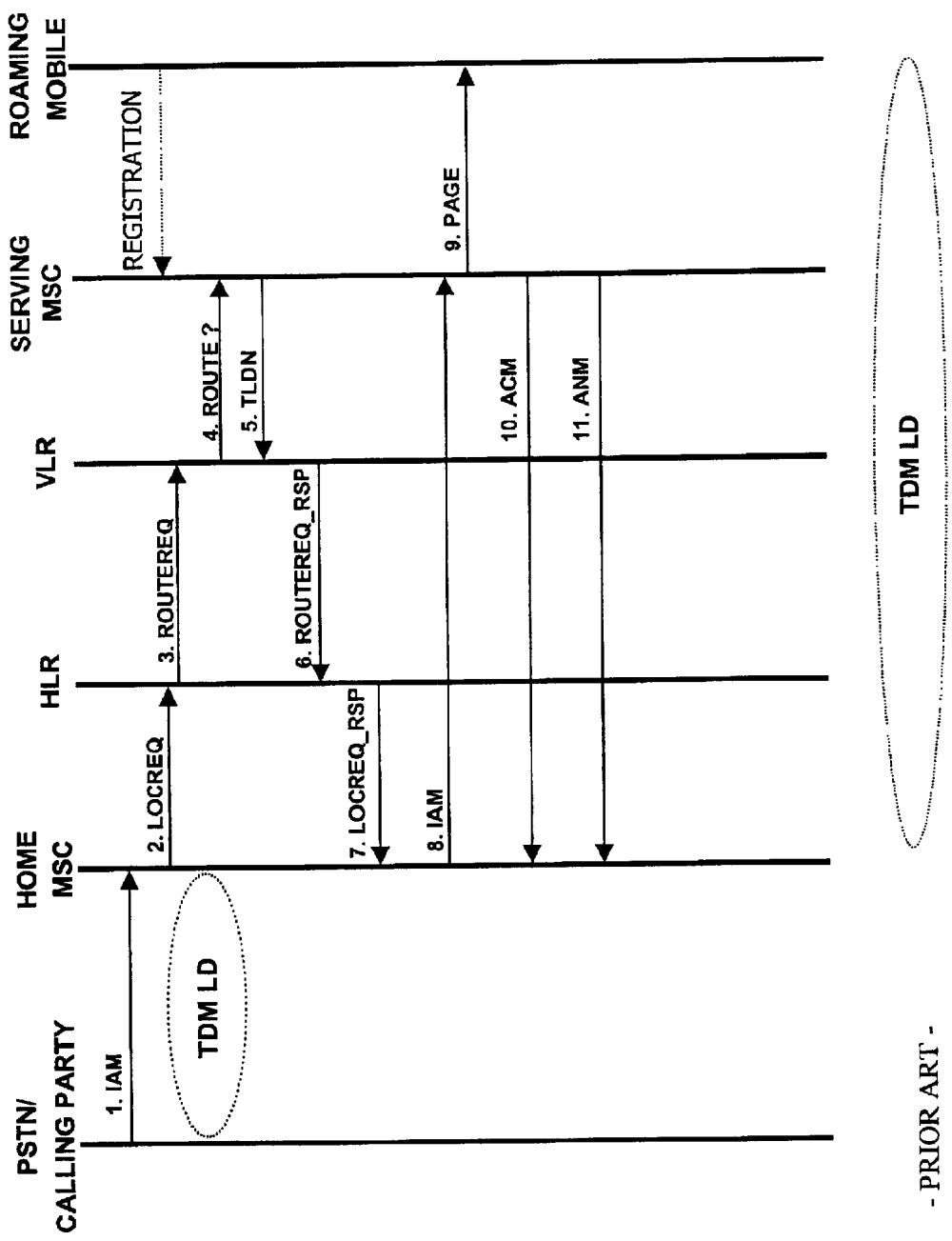
FIG. 2 is a timing diagram with a signal flow for a PSTN originated call to a roaming mobile.

A block diagram of a communication system utilizing a virtual tandem switch is shown in FIG. 3. The PSTN 301 receives a call from a calling party, which call is intended for a roaming mobile 315. The PSTN 301 is operably coupled to a TDM local exchange carrier (LEC) 303 that provides local connection between the PSTN and a VTS server 305. The VTS server 305 is operably coupled to a packet transport network 307 that utilizes a packet-based protocol, such as Asynchronous Transfer Mode (ATM) or Internet Protocol (IP), as are known in the art, to transport data in a packet-based manner between the VTS servers 305 and 309. The VTS server 309 has a virtual connection via the serving MSC 313 to its VLR 311. The VTS server 309 is operably coupled to the serving MSC 313, which is located in the geographical area of the roaming mobile 315. The VTS servers 305 and 309 are part of the VTS 317 and are geographically located throughout the cellular carrier's system. Although the VTS servers 305 and 309 of the VTS 317 are shown within Service Area 1 and Service Area 2, the VTS 317 may have servers/components distributed among any number of service areas. Long distance voice networks, such as the TDM LD network, are bypassed.

Figure 4:
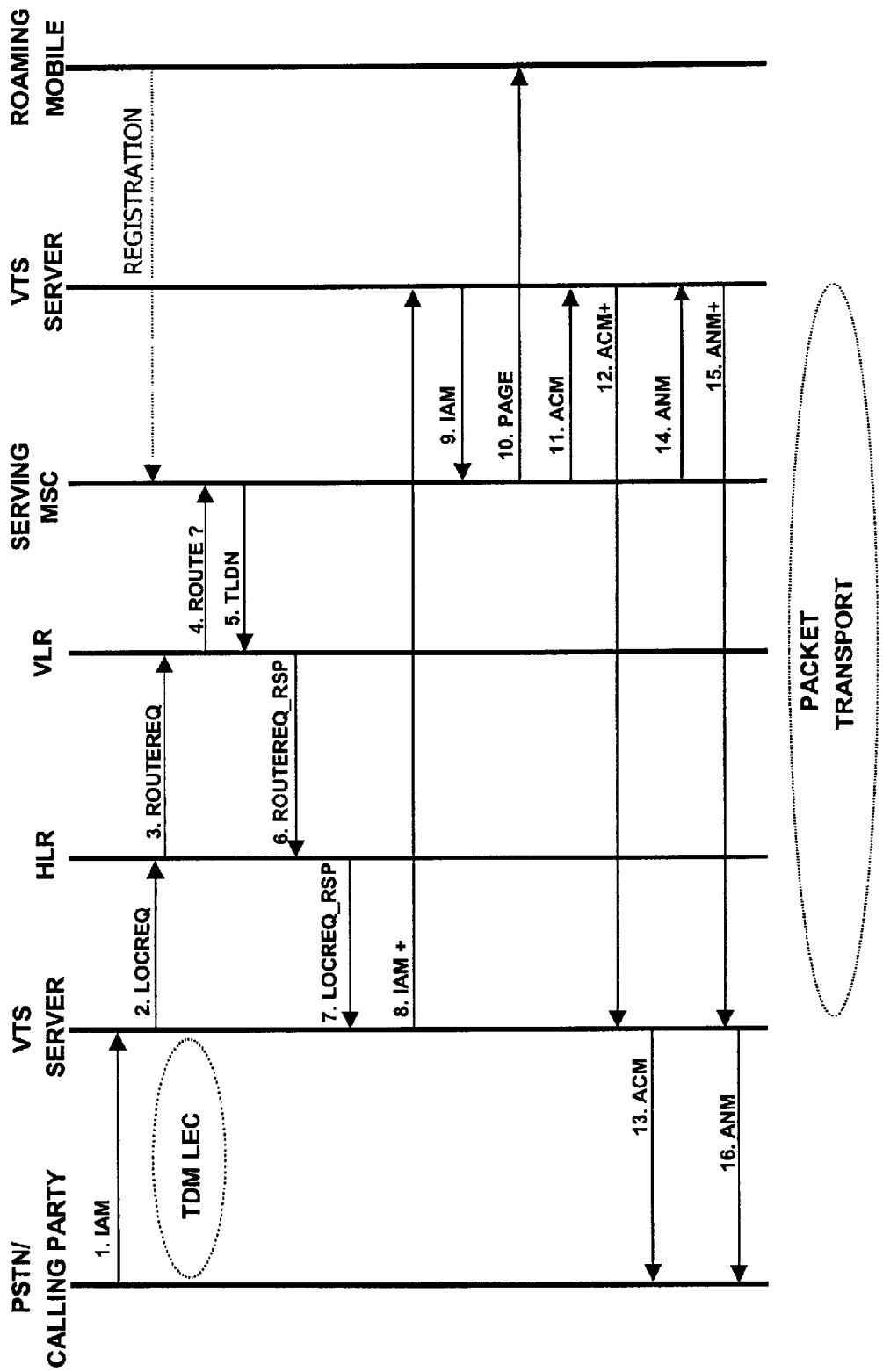
FIG. 4 is a timing diagram with a signal flow for a PSTN originated call to a roaming mobile and utilizing a VTS in accordance with the invention.

An example of a timing diagram with a signal flow for a PSTN originated call to a roaming mobile and utilizing a VTS is shown in FIG. 4. Once the roaming mobile registers with a serving MSC, as known in the art, the roaming mobile may then receive calls via the VTS 317. The call flow, as depicted in FIG. 4, requires no changes to PSTN switches or the MSCs. In addition, this call flow does not involve the home MSC, thereby reducing the processing load in the home MSC. The VTS 501 may be optionally programmed to respond to queries and to accept call handoffs, although such functions are not necessary for the successful operation of the VTS 501 as described herein.

At 1, The call is received at the PSTN 301 and routed to the nearest VTS server 305 via the TDM LEC 303 using ISUP (ISDN User Part) signaling. At 2, the VTS server 305 initiates an IS-41 location request (LOCREQ), in the same way the home MSC initiates a location request as known in the art. Steps 3 through 7 are processed known in the art. At 3, the HLR queries (ROUTEREQ) for routing information. At 4, the VLR 311 queries for routing information. At 5, the serving MSC 313 calculates a Temporary Local Directory Number (TLDN) and forwards it back to the VLR 311. At 6, the VLR 311 forwards (ROUTEREQ_RSP) the TLDN to the HLR. At 7, the HLR forwards (LOCREQ_RSP) the TLDN to the originating VTS server 305.

At 8, based on the received TLDN, the originating VTS server 305 sets up (IAM+) a connection between it and the terminating VTS server 309 over the packet transport network 307. With a distributed architecture, the VTS server 305 is able to set up a virtual trunk carrying the voice as close to the user as possible. At 9, the terminating VTS Server sends the IAM to the serving MSC 313. At 10, the serving MSC 313 pages the mobile 315. At 11, the serving MSC 313 sends an Address Complete Message (ACM) to the terminating VTS server 309. At 12, the terminating VTS server 309 sends an ACM+to the originating VTS Server 305 to confirm that address message is complete. At 13, the originating VTS server 309 sends the ACM to the PSTN 301. At 14, the serving MSC 313 sends an ANswer Message (ANM) to the terminating VTS server 309 when the mobile answers the call. At 15, the terminating VTS Server 309 sends an ANM+to the originating VTS Server 305. At 16, the originating VTS Server 305 sends the ANM to the PSTN 301.

Figure 5:
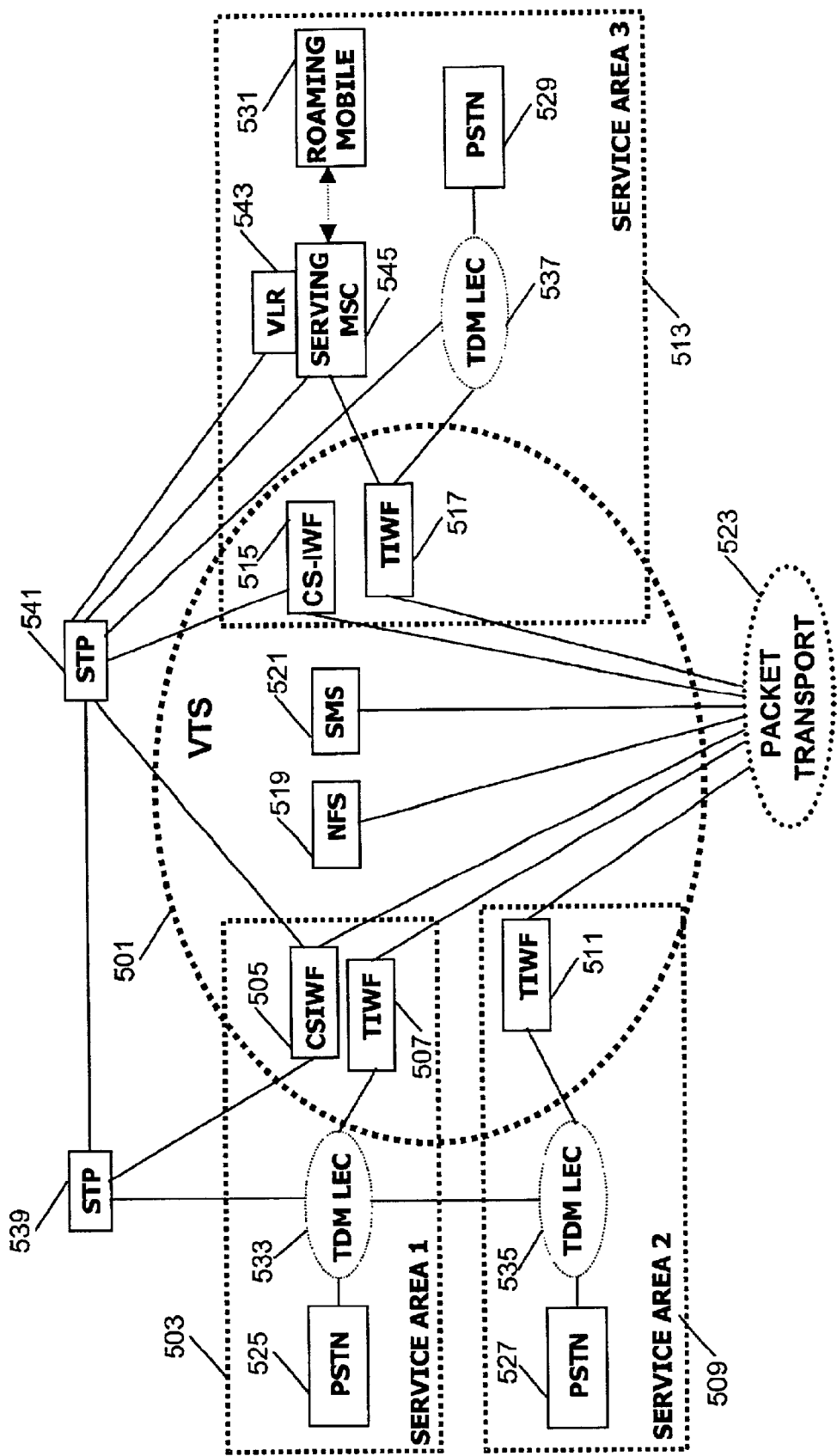
FIG. 5 is a block diagram of a virtual tandem switch (VTS) in accordance with the invention.

An example block diagram of a virtual tandem switch (VTS) is shown in FIG. 5. As shown in the example of FIG. 5, the components or servers of the VTS 501 are distributed among three service areas 503, 509, and 513. Only three service areas are shown in FIG. 5 for the sake of simplicity, although the VTS may be distributed over a large number of service areas. The VTS 501 is a collection of VTS servers that performs like a single switch and includes the functions of converting signals to an appropriate protocol, such as packet-based protocols, and converting voice encoding between the TDM network and packet networks. Although the present invention is described with respect to the IS-41 protocol by example, the present invention may be applied to networks utilizing any wireless protocol.

The VTS 501 includes one or more VTS servers 305 and 309. The VTS servers include one or more Connection/Signaling InterWorking Functions (CSIWFs), Trunking InterWorking Functions (TIWFs), and Network Feature Servers (NFSs). The VTS also includes a Switch Management System (SMS) that is an internal management system that performs the provisioning, fault management, configuration management, performance management, security, maintenance, updating, monitoring, house-keeping tasks, and so forth for all the elements in the VTS 501, and keeps the VTS 501 operating effectively as a single switch. The NFS 519 provides call feature functionality, such as address translation, routing, TCAP queries, billing and so forth, for the VTS. Whenever a CSIWF receives a call, the CSIWF forwards the call to the NFS for routing. The NFS determines the destination CSIWF and instructs the destination CSIWF to set up a virtual voice trunk over the packet network.

The VTS 501 includes, within geographical service area 1, a CSIWF 505 and a TIWF 507. The CSIWF 505 or 515 performs signalling conversion and interworking between two networks, such as heterogeneous or homogeneous networks, while the TIWF 507, 511, or 517 performs voice trunking interworking between networks, such as heterogeneous or homogeneous networks. The networks may be, for example, TDM and packet-based networks. The CSIWF 505 and the TIWF 507 are two servers that are parts of the VTS 501 that assist with intercommunications between service area 1 and the other service areas supported by the VTS 501. Similarly, a TIWF 511 is located within service area 2 and a CSIWF 515 and a TIWF 517 are located within service area 3, which components provide interfaces between the various service areas supported by VTS 501. The CSIWF and TIWF perform as converters and may be part of the same server.

The VTS 501 also includes an NFS 519 that provides network routing, such as initiating Transaction Capabilities Application Part (TCAP) and IS-41 location queries. The NFS 519 knows where calls need to be routed and handles the protocols and directs conversions necessary to provide that routing. The VTS 501 also includes an SMS 521 that provides operation, administration, and provisioning of all the components that are part of the VTS 501. For higher reliability, a backup NFS and/or SMS may be added to the VTS 501. The different components or servers of the VTS 501 communicate with each other via a packet transport network 523, although these devices may communicate on a separate network.

Each of the service areas typically has a connection to the PSTN 525, 527, and 529 such that calls from a wireline calling party to the roaming mobile 541 or calls from the roaming mobile 541 to a wireline called party may be completed via the PSTN. In the example shown, the roaming mobile 531 is in service area 3. Within each of the service areas, a TDM or other type of local exchange carrier 533, 535, or 537 is used to transport calls and call set-up between the PSTN and the VTS 501. By utilizing a local exchange, long distance tolls are avoided and traffic on the long distance network is significantly reduced because calls between wireless networks and the PSTN no longer need to go through long distance voice networks.

The CSIWF 505 or 515 provides a signaling interface for signaling standards, such as ISUP (ISDN user part) or TCAP (transaction capability protocol), over a network, such as an SS7 network available from Lucent Technologies, as well as a broadband signaling interface to the packet-based transport network. The CSIWF 505 or 515 provides a control interface for call setup functions and other control issues, and converts signaling between a packet-based protocol and the protocol of the message at the other end of the CSIWF 505 or 515, such as ISUP or ATM UNI (User-Network Interface). The CSIWF 505 or 515 manages connections in the network and performs narrowband/broadband signaling interworking functions. The CSIWF 505 or 515 performs as a connection gateway and may include an SD-SS7 Signalling Distributor and Signalling Link Interface, available from Lucent Technologies, to provide this function. The CSIWF 505 or 515 provides an interface to a local STP (Signalling Transport Point) 539 or 541 for the purpose of receiving set-up messages from the TDM LEC switches and sending/receiving TCAP messages to/from a Service Control Point (SCP), a network-based computer and associated database used to provide advanced services in intelligent telecommunications networks. The CSIWFs exchange ISUP++ messages with the NFS and ATM or IP set-up messages with an ATM switch or IP routers within the packet network.

The trunking interworking function (TIWF) 507, 511, or 517 converts voice to and from the packet-based protocol, including synchronous to asynchronous conversion and vice versa, as necessary. For example, the TIWF 507, 511, or 517 may convert TDM voice signals to and from a packet-based protocol, such as ATM or IP. The TIWF 507, 511, or 517 may also perform echo control. The TIWFs 507, 511, and 517 are advantageously deployed near the LEC 533, 535, or 537, resulting in short physical cabling that provides security and reliability. Converting TDM voice into packetized voice as early as possible may reduce TDM trunking costs.

In the service area where the roaming mobile 531 is currently located, a VLR 543 and serving MSC 545 are used to communicate with the roaming mobile 531 and to interface to the VTS 501 as well as the STP that is local to the serving MSC 545. The following is an example of a call set-up from a PSTN caller to a mobile utilizing a VTS 501 in different service areas. When a PSTN 525 user within the first service area 503 calls a wireless mobile 531 that has roamed to the third service area 513, the call is routed to the VTS 501 via STP 539. Internal to the VTS 501, the originating CSIWF 505 interworks with the STP 539 like regular tandem switch and routes the set-up message to the NFS 519. The NFS 519 initiates an IS-41 location query request to serving MSC 545 and determines which terminating CSIWF 515 to use from the TLDN. The NFS 519 then forwards a set-up message to the terminating CSIWF 515, which in turn, sets up a bearer channel through the packet transport network 523 and, at the same time, regenerates an IAM message to the serving MSC 545 via STP 541.

In an example where a PSTN caller from service area 1 calls a wireless mobile also within the first service area 503, the call sequence is much simpler. The CSIWF 505 handles the set-up signaling. The NFS 519 determines that the terminating CSIWF 515 is actually the originating CSIWF 505. The CSIWF 505 instructs the TIWF 507 to connect the in-coming trunk and out-going trunk in the TIWF TDM fabric, without even utilizing the packet network, thereby avoiding the use of all long distance resources, including both voice and packet resources.

Although the present invention was described with respect to providing calls from the PSTN to roaming mobiles, the present invention may be applied to local calls, intra-LATA calls, or other non-roaming applications.

Narrowband protocols used by and/or supported by the VTS 501 include SS7 ISUP (GR246, GR317, and GR394), Primary Rate Interface (PRI), and TCAP, among others. Broadband protocols used by and/or supported by the VTS 501 include ATM UNI 3.1/4.0. Other protocols used by and/or supported by the VTS 501 include Internet Protocol Device Control (IPDC), IPDC+, Media Gateway Control Protocol (MGCP), H.248, ISUP+, and bearer independent call control (BICC). The VTS 501 may be made compatible and comply with numerous communications standards, including GR246, GR317, GR394, ANSI T1.113, and T1S1.6 LNP.

The VTS acts as a single gateway between wireless networks and the PSTN and inter-connects MSCs. The VTS provides distributed call processing and connection control functions, while appearing to the wireless network and the PSTN as a single switch. The connection control function provides transmission interface to the PSTN and the wireless network, while the call processing function determines the optimal routes between MSCs. The present invention provides for call set-up with minimum and localized resources as compared to previous methods. Geographically centralized tandem routing may be eliminated. The present invention requires no changes to PSTN switches or the MSCs, making the invention easier to be implemented in existing networks. In addition, call flows do not involve the home MSC, thereby reducing the processing load in the home MSC. The present invention is applicable to roaming and non-roaming applications. The architecture may be utilized generally to provide long distance services over bandwidth-efficient packet-based networks. The call flows do not involve TDM LD networks that are typically operated by carriers other than the wireless service providers, thereby avoiding tariff charge for roaming calls and enabling wireless service providers to offer lower-cost, wider-coverage services. Termination call features on the terminating MSC are supported transparently. A VTS may be effectively utilized with TDMA, CDMA, GSM, and UMTS networks, including the various standards that are utilized within these networks.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes that come within the meaning and range of equivalency of the claims are to be embraced within their scope.

What is claimed is:

1. A method comprising the steps of:
    directing a call intended for a mobile to a virtual tandem switch;
    querying, by the virtual tandem switch, a home location register to obtain call information for the mobile;
    converting control messages at a first location, between a packet-based protocol and a non-packet-based protocol;
    converting voice messages at a first location, between a packet-based protocol and a non-packet-based protocol;
    converting control messages at a second location, between a packet-based protocol and a non-packet-based protocol;
    converting voice messages at a second location, between a packet-based protocol and a non-packet-based protocol; and setting up the call to the mobile over a packet-based transport network;
    wherein the virtual tandem switch supports protocols selected from the group consisting of ISUP, Primary Rate Interface (PRI), and Transaction Capabilities Application Part (TCAP), ATM UNI 3.1/4.0, Internet Protocol Device Control (IPDC), IPDC+, Media Gateway Control Protocol (MGCP), H.248, ISUP+, and bearer independent call control (BICC).

2. The method of claim 1, wherein the step of converting non-packet-based protocol voice messages at a first location comprises converting a time division multiplexed protocol.

3. The method of claim 1, wherein the call is directed to the mobile while the mobile is roaming away from its home service area.

4. The method of claim 1, wherein the step of converting the non-packet-based protocol voice messages at a second location comprises converting a time division multiplexed protocol.

5. The method of claim 1, further comprising the step of routing at least one of the control messages and voice messages between the first and the second locations with a network feature server.

6. The method of claim 1, wherein the mobile accesses a wireless network based on a wireless air interface selected from the froup consisting of IS-41, TDMA, CDMA, GSM, and UMTS.

7. The method of claim 1, wherein the virtual tandem switch performs echo control.

8. A switch comprising:
    a first converter arranged and constructed to convert control messages between a packet-based protocol and a first protocol, wherein the first converter is located at a first geographic location;
    a second converter arranged and constructed to convert voice messages between a packet-based protocol and a first protocol, wherein the second converter is located at the first geographic location;
    a third converter arranged and constructed to convert control messages between a packet-based protocol and a second protocol, wherein the third converter is located at a second geographic location; and
    a fourth converter arranged and constructed to convert voice messages between a packet-based protocol and a second protocol, wherein the fourth converter is located at the second geographic location; and
    wherein the switch provides a gateway between the public switched telephone network and a wireless network; and
    wherein the switch supports protocols selected from the group consisting of ISUP, Primary Rate Interface (PRI), and Transactions Capabilities Application Part (TCAP), ATM UNI 3.1/4.0, Internet Protocol Device Control (IPDC), IPDC+, Media Gateway Control Protocol (MGCP), H.248, ISUP+, and bearer independent call control (BICC).

9. The switch of claim 8, wherein the first protocol is an ISDN User Part signalling protocol and the second protocol is a time division multiplexed protocol.

10. The switch of claim 8, further comprising a network feature server, arranged and constructed to provide network routing between the converters.

11. The switch of claim 8, further comprising a switch management system, arranged and constructed to provide operation, administration, and provisioning of the converters of the switch.

12. A method of providing a gateway between a public switched telephone network and a wireless network comprising the steps of:
    converting control messages at a first location, between a packet-based protocol and a non-packet-based protocol;
    converting voice messages at a first location, between a packet-based protocol and a non-packet-based protocol;
    converting control messages at a second location, between a packet-based protocol and a non-packet-based protocol; and
    converting voice messages at a second location, between a packet-based protocol and a non-packet-based protocol;
    wherein the gateway supports protocols selected from the group consisting of ISUP, Primary Rate Interface (PRI), and Transaction Capabilites Application Part (TCAP), ATM UNI 3.1/4.0, Internet Protocol Device Control (IPDC), IPDC+, Media Gateway Control Protocol (MGCP), H.248, ISUP+, and bearer independent call control (BICC).

13. The method of claim 12, wherein the step of converting the non-packet-based protocol voice messages at a first location comprises converting a time division multiplexed protocol.

14. The method of claim 12, wherein the step of converting the non-packet-based protocol voice messages at a second location comprises converting a time division multiplexed protocol.

15. The method of claim 12, further comprising the step of routing at least one of the control messages and voice messages between the first and the second locations with a network feature server.

* * * * *